US012620023B1

(12) United States Patent
Maney et al.

(10) Patent No.: US 12,620,023 B1
(45) Date of Patent: May 5, 2026

(54) SMART CONTRACT MANAGED COMPANY BANK ACCOUNT

(71) Applicant: United Services Automobile Association (USAA), San Antonio, TX (US)

(72) Inventors: Will Kerns Maney, San Antonio, TX (US); Jon D. McEachron, Boerne, TX (US); Nathan Lee Post, Rockport, TX (US); Mark Paxman Warnick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 16 days.

(21) Appl. No.: 18/414,707

(22) Filed: Jan. 17, 2024

Related U.S. Application Data

(60) Provisional application No. 63/439,319, filed on Jan. 17, 2023.

(51) Int. Cl.
G06Q 40/02 (2023.01)
(52) U.S. Cl.
CPC .................................... G06Q 40/02 (2013.01)
(58) Field of Classification Search
USPC .......................................................... 705/35
See application file for complete search history.

(56) References Cited

U.S. PATENT DOCUMENTS

| | | | | |
|---|---|---|---|---|
| 6,685,088 B1 * | 2/2004 | Royer | .................... | G06Q 20/28 |
| | | | | 235/380 |
| 7,257,367 B2 * | 8/2007 | Etuk | .................. | G06Q 30/0226 |
| | | | | 434/350 |
| 7,784,685 B1 * | 8/2010 | Hopkins, III | ........ | G06Q 20/347 |
| | | | | 235/382 |
| 7,941,368 B2 * | 5/2011 | Chang | .................... | G06Q 40/02 |
| | | | | 705/40 |

(Continued)

OTHER PUBLICATIONS

V. C. Gupta, S. Gabadia, M. Agarwal and K. Samdani, "An Intrinsic Review on Securitization using Blockchain," 2021 International Conference on Computational Performance Evaluation (ComPE), Shillong, India, 2021, pp. 971-976, (Blockchain).*

(Continued)

*Primary Examiner* — Chikaodinaka Ojiaku
(74) *Attorney, Agent, or Firm* — Fletcher Yoder, P.C.

(57) ABSTRACT

This disclosure is directed to systems and methods for system for managing a bank account utilizing smart contracts. The systems and methods include utilizing a processing system to perform actions. The actions include receiving an application and application-related inputs from a first entity for entering into an agreement to receive assets and/or funds from the bank account owned by a second entity. The actions also include conducting, via an artificial intelligence module, an analysis of the first entity based on the application-related inputs. The actions further include approving and executing, via the artificial intelligence module, a smart contract that is representative of the agreement between the first entity and the second entity when the analysis of the first (Continued)

entity meets specific requirements, wherein executing the smart contract includes distributing the assets and/or the funds to the first entity in accordance with the smart contract.

16 Claims, 6 Drawing Sheets

(56) References Cited

U.S. PATENT DOCUMENTS

| | | | | |
|---|---|---|---|---|
| 9,324,098 | B1 * | 4/2016 | Agrawal | G06Q 30/04 |
| 10,333,705 | B2 * | 6/2019 | Smith | G06Q 20/3278 |
| 10,637,665 | B1 * | 4/2020 | Sundaresan | H04L 63/083 |
| 10,997,572 | B2 * | 5/2021 | Cole | G06Q 20/108 |
| 11,546,143 | B2 * | 1/2023 | Chen | H04L 9/0833 |
| 11,574,291 | B2 * | 2/2023 | Hertzog | G06F 21/64 |
| 11,580,532 | B1 * | 2/2023 | Winklevoss | G06Q 20/3674 |
| 12,155,781 | B1 * | 11/2024 | Helfgott | H04L 9/3239 |
| 12,190,300 | B1 * | 1/2025 | Bowers | G06Q 20/4037 |
| 2003/0042301 | A1 * | 3/2003 | Rajasekaran | G06Q 20/04 235/380 |
| 2004/0050928 | A1 * | 3/2004 | Bishop | G07F 7/02 235/380 |
| 2007/0136168 | A1 * | 6/2007 | Dilip | G06Q 20/401 705/35 |
| 2007/0228156 | A1 * | 10/2007 | Eckert | G06Q 20/227 235/380 |
| 2009/0132405 | A1 * | 5/2009 | Scipioni | G06Q 20/385 705/35 |
| 2009/0134214 | A1 * | 5/2009 | Randazza | G06Q 20/28 235/379 |
| 2009/0171825 | A1 * | 7/2009 | Roman | G06Q 20/042 382/137 |
| 2010/0217682 | A1 * | 8/2010 | Chan | G06Q 20/363 705/26.1 |
| 2012/0158584 | A1 * | 6/2012 | Behren | G06Q 20/105 705/41 |
| 2012/0173409 | A1 * | 7/2012 | Hu | G06Q 20/108 705/39 |
| 2013/0030941 | A1 * | 1/2013 | Meredith | G06Q 30/06 705/26.1 |
| 2014/0108108 | A1 * | 4/2014 | Artman | G06Q 20/322 705/14.1 |
| 2015/0186990 | A1 * | 7/2015 | Joseph | G06Q 20/34 705/16 |
| 2015/0220928 | A1 * | 8/2015 | Allen | G06Q 20/10 705/67 |
| 2016/0092988 | A1 * | 3/2016 | Letourneau | G06Q 20/223 705/66 |
| 2016/0358161 | A1 * | 12/2016 | Cobban | G06Q 20/0655 |
| 2017/0206516 | A1 * | 7/2017 | Watson | G06Q 20/3274 |
| 2017/0249632 | A1 * | 8/2017 | von Behren | G06Q 20/10 |
| 2020/0026834 | A1 * | 1/2020 | Vimadalal | H04L 9/0825 |
| 2020/0097961 | A1 * | 3/2020 | Luo | G06Q 20/123 |
| 2020/0193429 | A1 * | 6/2020 | Babar | H04L 9/3239 |
| 2020/0322131 | A1 * | 10/2020 | Sundaresan | H04L 9/14 |
| 2022/0368541 | A1 * | 11/2022 | Palatov | H04L 9/3268 |
| 2023/0020878 | A1 * | 1/2023 | Bowie | G06Q 20/18 |
| 2023/0075217 | A1 * | 3/2023 | Rosanwo | G06Q 40/08 |
| 2024/0135374 | A1 * | 4/2024 | Yip | G06Q 20/02 |
| 2024/0193585 | A1 * | 6/2024 | Adapala | G06Q 20/36 |

OTHER PUBLICATIONS

G. S. Ilgi, D. Kayali, P. Olawale, B. Demir Erdem, K. Dimililer and Y. Kirsal-Ever, "Formal Verification for Security Technologies in the Blockchain with Artificial Intelligence: A survey," 2022, pp. 1-6 (Blockchain). (Year: 2022).*

* cited by examiner

SMART CONTRACT MANAGED COMPANY BANK ACCOUNT

CROSS-REFERENCE TO RELATED APPLICATIONS

The present application claims priority to and the benefit of U.S. Provisional Application No. 63/439,319, entitled "SMART CONTRACT MANAGED COMPANY BANK ACCOUNT," filed on Jan. 17, 2023, the disclosure of which is incorporated by reference herein in its entirety for all purposes.

BACKGROUND

Sometimes a company or organization enters a sponsorship agreement with other entities in exchange for exposure to increase their brand awareness and to promote themselves as well as their products and services. In some cases, a company or organization enters an affiliate marketing agreement with an independent contractor to perform affiliate marketing services on behalf of the company or organization. Most large companies currently utilize a team of people on staff to filter, verify, approve, and distribute funds for these sponsorship or marketing agreements. Small startups or individual artists may want to promote themselves, their services, or their products as well. However, small startups or individual artists often lack the staff to deal with the overhead for filtering, verifying, approving, and distributing funds related to sponsorship or marketing agreements. In addition, these small startups or individual artists may lack the legal resources or experience in conducting transactions involving sponsorship or marketing agreements or similar arrangements.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system for managing a bank account utilizing smart contracts is provided. The system includes a processing system including one or more hardware processors. The system also includes a non-transitory memory, the non-transitory memory storing instructions that, when executed by the processing system, causes the processing system to perform actions. The actions include receiving an application and application-related inputs from a first entity for entering into an agreement to receive assets and/or funds from the bank account owned by a second entity. The actions also include conducting, via an artificial intelligence module, an analysis of the first entity based on the application-related inputs. The actions further include approving and executing, via the artificial intelligence module, a smart contract that is representative of the agreement between the first entity and the second entity when the analysis of the first entity meets specific requirements, wherein executing the smart contract includes distributing the assets and/or the funds to the first entity in accordance with the smart contract.

In another embodiment, a computer-implemented method for managing a bank account utilizing smart contracts is provided. The computer-implemented method includes receiving, at a processing system, an application and application-related inputs from a first entity for entering into an agreement to receive assets and/or funds from the bank account owned by a second entity. The computer-implemented method also includes conducting, via an artificial intelligence module via the processing system, an analysis of the first entity based on the application-related inputs. The computer-implemented method further includes approving and executing, via the artificial intelligence module via the processing system, a smart contract that is representative of the agreement between the first entity and the second entity when the analysis of the first entity meets specific requirements, wherein executing the smart contract comprises distributing the assets and/or the funds to the first entity in accordance with the smart contract, wherein executing the smart contract comprises monitoring utilization of the assets by the first entity. The computer-implemented method even further includes providing, via the artificial intelligence module via the processing system, user-perceptible notification to the second entity when activity by the first entity falls outside a scope of the smart contract.

In a further embodiment, a non-transitory computer-readable medium is provided. The non-transitory computer-readable medium includes processor-executable code that when executed by a processing system, causes the processing system to perform actions. The actions include receiving an application and application-related inputs from a first entity for entering into an agreement to receive assets and/or funds from a bank account owned by a second entity. The actions also include conducting, via an artificial intelligence module, an analysis of the first entity based on the application-related inputs. The actions further include receiving inputs from the second entity related to the agreement and to generate, via the artificial intelligence module, a smart contract based on the inputs. The actions even further include approving and executing, via the artificial intelligence module, the smart contract that is representative of the agreement between the first entity and the second entity when the analysis of the first entity meets specific requirements, wherein executing the smart contract comprises distributing the assets and/or the funds to the first entity in accordance with the smart contract

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
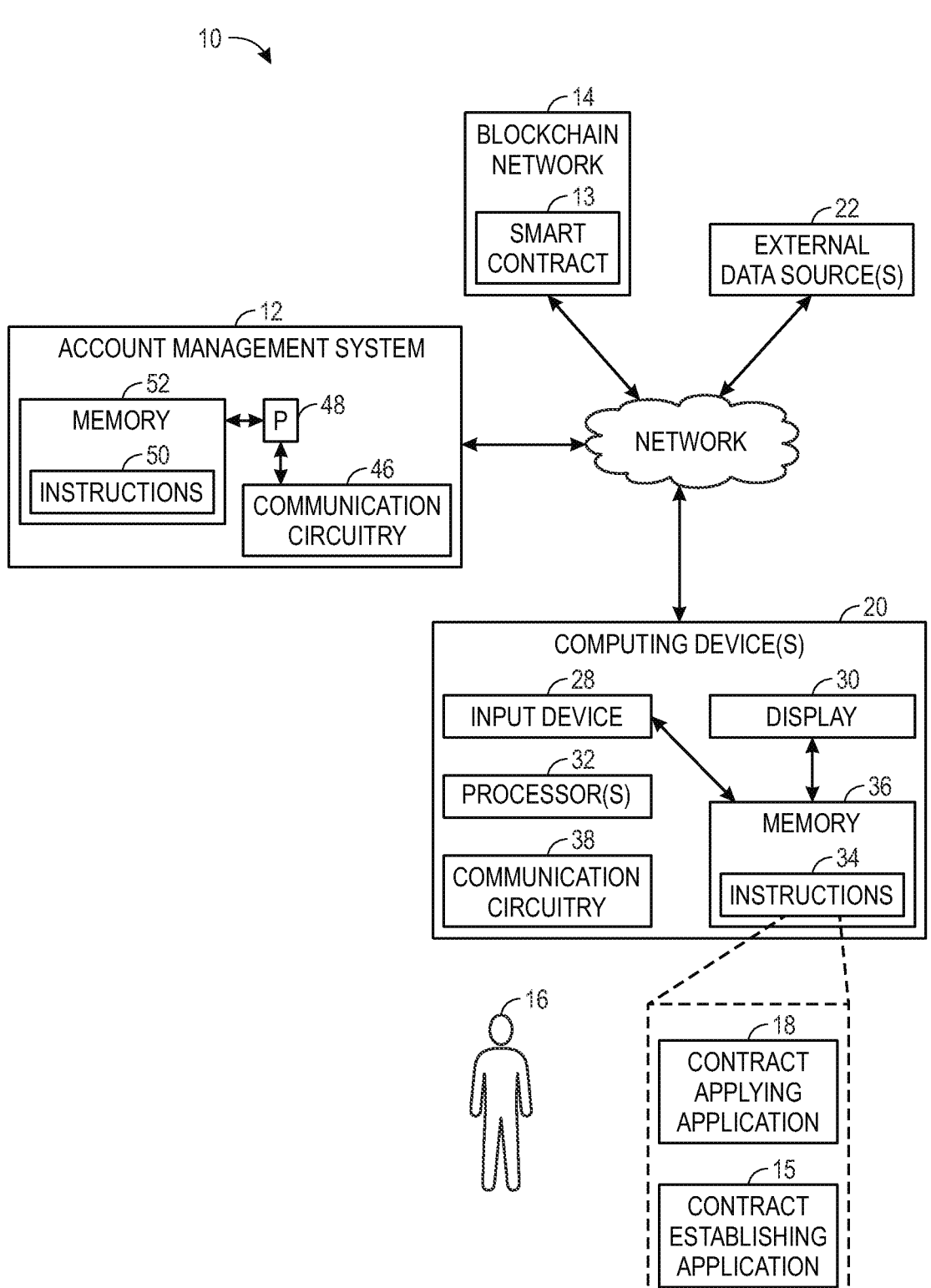
FIG. 1 is a schematic diagram of a system for managing a bank account (e.g., company bank account) utilizing smart contracts, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, the term "application" refers to one or more computing modules, programs, processes, workloads, threads, and/or computing instructions executed by a computing system. Example embodiments of an application include software modules, software objects, software instances, and/or other types of executable code. As referred to herein, "user data" may include data associated with and/or identifying a user. In certain embodiments, user data may include data that relates to the actions performed by the user while utilizing a computing device, and/or with information associated with and/or identifying the user. For example, user data may include an indication of actions performed by the user (e.g., a website opened, cookies, an application accessed, a file downloaded, a link associated with a product that the user selected, a rating performed by the user such as an upvote or like, home or office temperature setting, preferred shows, light settings, activities, activity patterns, etc.), user identity data (e.g., IP address, email, and the like), or demographic information of the user (e.g., age, race, location, and the like).

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions. In addition, as used herein, the term "autonomous" and "autonomously" refers to functions that are performed by computing devices or systems solely based on the functionality programmed into the computing devices or systems, for example, without requiring human intervention and/or input from external sources, such as external data sources. In addition, as used herein, the term "bot" refers to an autonomous program configured to autonomously run on a computer network to provide certain functionality and/or data for human users without the need for receiving active supervision from the human users. In other words, a bot may be capable of finding and/or learning certain functionality and/or data even when human users of the bot are not interacting with the bot and/or computer network on which the bot is running.

The present disclosure relates generally to systems and methods for managing a bank account (e.g., company bank account) utilizing smart contracts. For example, in certain embodiments, an entity (e.g., small startup or individual artist (or their company)) may setup a bank account for distributing funds to other entities (e.g., companies or events) via various agreements (e.g., sponsorship agreements, affiliate marketing agreements, etc.) entered into with these various entities. An artificial intelligence (AI)-based account management system manages the bank account. In particular, the account management system automatically handles the bulk of the interactions utilizing smart contracts. The account management system handles answering questions from applicants (e.g., entities such as a company or event) wanting to enter an agreement with the account owning entity to receive funds/assets from the bank account. The account management system also analyzes the background of the applying entities to make sure the applying entities meet certain requirements (e.g., applicant to be a woman, applicant to be a particular minority group, or applicant not to have conducted undesired behavior (e.g., harm animals)) as determined by the account owning entity.

Upon meeting the requirement and passing the analysis, the rest of the process is automated in accordance with the smart contract entered to by the approved entity. The smart contract holds all of the business logic or requirements for the agreements. For example, the account management system distributes funds and/or assets to the approved entity in accordance with the smart contract. The assets may be provided with requirements and metadata about how the assets are to be used. In certain embodiments, the assets may be provided as digital tokens on a distributed ledger or blockchain, where the digital tokens represent either digital or physical assets. In certain embodiments, the assets may be logo asset tokens that enable tracking and reporting of the assets when in use. These logo asset tokens may include metadata on how to use the logo asset tokens (e.g. logo must appear in physical prints, banners, posters, and on a website). The smart contract and/or assets self-report on where and how the assets are being utilized. The account management system gathers the data and periodically (e.g., weekly or monthly) generate reports for review (e.g., by the account owning entity). In certain embodiments, alerts may be generated for violations of the smart contracts and notifications may be provided to the account owning entity (or asset owner) to take actions (e.g., make corrections to the smart contract, terminate contract, etc.). Utilizing the AI-based account management system to manage the bank account via the smart contracts reduces overhead. This makes it easier for a small startup or individual artist to enter and manage these various agreements with other entities. It should be noted that larger entities may also utilize the disclosed techniques. In addition, the disclosed techniques may be utilized for microtransactions to make transactions profitable that are not normally profitable.

FIG. 1 is a schematic diagram of a system 10 for managing a bank account (e.g., company bank account) utilizing smart contracts. The bank account may include funds and/or assets. The bank account may be owned by a single entity (e.g., company, organization, or individual) such as a small startup or individual artist. In certain embodiments, the bank account may be owned by multiple entities (e.g., companies, organizations, or individuals) (e.g., via a partnership contract). Each entity of the multiple entities may own one or more assets in the bank account. The bank account may be established by the account owning entity to enable various agreements (e.g., sponsorship agreements, affiliate marketing agreements) to be entered with other entities (e.g., companies, organization, events (e.g., ongoing event or short-lived event), etc.) to enable the account owning entity, the services provided by the account owning entity, or the products (e.g., art, music, etc.) of the account owning entity to be promoted. In one example, the account owning entity may be a musical artist wanting to promote their music or some cause (e.g., charity or foundation) they are associated with and the other entities could be concerts, venues, festivals, a maker of a product, and so forth. In certain embodiments, the bank account may be established for microtransactions. For example, the account owning entity may be an insurance company and the other entity could be an insurance customer. In case of a power outage, the bank account may be managed (e.g., via a smart contract) to reimburse the insurance customer for a least a portion of expenses for lost food.

The system 10 includes an account management system 12 (e.g., physical computing system and/or a cloud-computing system) configured to manage the bank account via smart contracts 13. The account management system 12 is configured to utilize artificial intelligence (AI) (e.g., a think layer of AI) in the management of the bank account. The account owning entity interacts (e.g., via computing device) with the account management system 12 (e.g., via contract establishing application 15) in establishing how the bank account is to be managed (e.g., via smart contracts 13). For example, the entity owning the bank account may provide some inputs to the account management system 12 related to the bank account. These inputs may relate to the type of agreements they want to enter (e.g., sponsorship agreement, affiliate marketing agreement, etc.). The inputs may also relate to how the assets and/or funds in the bank account are to be utilized. The inputs may be further related to requirements that the applying entity must meet to be able to enter an agreement with the account owning entity to utilize the funds and/or assets within the bank account. The requirements may be that the applying entity meet a certain criteria. For example, the entity may have to be a woman, to be a particular minority group, or that the entity engages in certain activities (e.g., providing support to an underserved group). In certain embodiments, the requirements may be that the applying entity not engage in or promote certain activities (e.g., harming of animals, use of guns, etc.). In certain embodiments, the inputs may be provided verbally. In certain embodiments, the inputs may be provided in layman terms and the account management system 12 may convert and present these inputs in legal terms within a smart contract 13.

The account management system 12 utilizes these inputs to generate one or more smart contracts 13 for managing the bank account. In certain embodiments, the account management system 12 may have a plurality of different models of smart contracts 13 (e.g., associated with different types of arrangements) to select from and modify based on the received inputs. In addition, different models of smart contracts 13 may be associated with different regional laws. The smart contract 13 exists across a distributed, decentralized blockchain network 14. The smart contract 13 automatically executes the agreement between the account owning entity and the sponsored or affiliated entity. The smart contract 13 will enable the account management system 12 to tap into application program interfaces (APIs) to enable access to other applications or platforms (e.g., social media platforms, audio streaming services, etc.) to track utilization of the assets (e.g., as part of blockchain commerce) and to distribute funds to the sponsored or affiliated entity in accordance with the terms of the smart contract 13 (e.g., receiving enough views and/or sales of a product of the account owning entity via the sponsored or affiliated entity). Once the smart contract 13 is finalized, it cannot be modified. However, in certain embodiments, certain assets such as non-fungible tokens may be augmented or additional stipulations can be provided in the metadata accompanying an asset.

An applying entity interfaces with the account management system 12 via a contract applying application 18 when applying to enter an agreement with the account owning entity for funds/assets from the bank account. The account management system 12 may receive and answer questions from the applying entity (e.g., about the smart contract 13). In certain embodiments, the account management system 12 may receive inputs from the applying entity and utilize those inputs to perform an analysis (e.g., AI analysis) of the applying entity (e.g., perform a background check). The account management system 12 may perform the analysis to determine that the applying entity meets all the requirements of the smart contract 13. Upon meeting the requirements and passing the AI analysis, the account management system 12 automatically proceeds with approving and executing the smart contract 13 (e.g., representing the sponsorship agreement, affiliate marketing agreement, insurance contract, etc.). In certain embodiments, prior to approval or subsequent to approval, the account management system 12 may present options to the applying entity of certain items that may be negotiated (e.g., amount of funds distributed based on the number of products sold via the sponsored or affiliated entity).

The smart contract 13 holds all of the business logic or requirements for the agreements. Upon entering the smart contract 13, the account management system 12 distributes funds and/or assets to the approved entity in accordance with the smart contract 13. The assets may be provided with requirements and metadata about how the assets are to be used. In certain embodiments, the assets may be provided as digital tokens on a distributed ledger or blockchain, where the digital tokens represent either digital or physical assets. In certain embodiments, the assets may be logo asset tokens that enable tracking and reporting of the assets when in use. These logo asset tokens may include metadata on how to use the logo asset tokens (e.g. logo must appear in physical prints, banners, posters, and on a website). The smart contract 13 and/or assets self-report on where and how the assets are being utilized. The account management system 12 gathers the reporting data and periodically (e.g., weekly or monthly) generate reports for review (e.g., by the account owning entity). In certain embodiments, alerts may be generated for violations of the smart contracts 13 and notifications may be provided to the account owning entity (or asset owner) to take actions (e.g., make corrections to the smart contract 13, terminate contract, etc.).

As depicted in FIG. 1, users 16 (e.g., applying entities) interact with the account management system 12 via contract applying applications 16 executable via computing devices 20 used by the users 16. Users (e.g., account owning entities) interact with the account management system 12 via contract establishing applications 15. In certain embodiments, the computing devices 20 may include any computing devices 20 configured to execute the contract establishing applications 15 or the contract applying applications 18 including, but not limited to, smart phones, computing tablets, personal computers (PCs), laptop computers, wearable computing devices, and so forth. In certain embodiments, each computing device 20 may be registered with the account management system 12 by, for example, registering the computing device 20 (e.g., using a universally unique identifier (UUID), media access control (MAC) address, and so forth) with a user account (e.g., using a unique user identification number) associated with a particular user 16.

Therefore, interaction with the contract establishing application 15 or the contract applying application 15 by a particular user 16 via a particular computing device 20 may be automatically associated with that user 16.

In certain embodiments, detected activity (e.g., utilization of assets/funds) of a particular user 16 (e.g., over the blockchain network 14 or other external data sources 22) may be continuously monitored for the purpose of tracking activity/assets in accordance with the smart contract 13. In certain embodiments, the detected activity may include the users 16 themselves manually entering data (e.g., by using one or more computing devices 20), may include self-reporting by the smart contract 13 or the assets (e.g., over the blockchain network 14 or other external data sources 22), or may include activity of the users 16 within one or more of the blockchain network 14 or other external data sources 22, which may be automatically tracked and transmitted to the account management system 12, which may in turn execute the smart contract 13 (e.g., distribute funds or assets in response to certain conditions being triggered).

The users 16 manipulate one or more input devices 28 (e.g., keyboards, mice, buttons, touch screens, and so forth) of the computing devices 20 to enable the users 16 to interact with the contract establishing application 15, the contract applying application 18, or applications or platforms associated with the blockchain network 14 or external data sources 22, which may be displayed on one or more displays 30 (e.g., light emitting diode (LED) displays, organic LED (OLED) displays, and so forth) of the computing devices 20. In certain embodiments, the users 16 may login to particular computing devices 20 such that user identifiers (e.g., user identification numbers) may be tracked to associate detected activity with the particular user 16.

As illustrated in FIG. 1, in certain embodiments, the computing devices 20 may also include processing circuitry such as one or more processors 32 (e.g., a processing system) configured to execute instructions 34 stored in memory media 36 of the respective computing device 20, wherein the instructions 34, when executed by the one or more processors 32 (e.g., processing system), enable the respective computing device 20 to interact with the contract establishing application 15 or the contract applying application 18, as well as other web pages, applications, and so forth and to detect activity of the user 16 with respect to the smart contract 13.

In certain embodiments, the one or more processors 32 (e.g., processing system) of the computing devices 20 may be any suitable type of computer processors or microprocessors capable of executing computer-executable code. In certain embodiments, the memory media 36 of the computing devices 20 may be any suitable articles of manufacture that can serve as media to store processor-executable code, data, or the like. These articles of manufacture may represent computer-readable media (e.g., any suitable form of memory or storage) that may store processor-executable code (e.g., the instructions 34) executed by the one or more processors 32 (e.g., processing system) to perform the presently disclosed techniques. In certain embodiments, the memory media 36 of the computing devices 20 may represent tangible, non-transitory computer-readable media (e.g., any suitable form of memory or storage) that may store the processor-executable code used by the one or more processors 32 (e.g., processing system) to perform various techniques described herein. It should be noted that non-transitory merely indicates that the media is tangible and not a signal. It should be noted that the components described above with regard to the computing devices 20 are exemplary components, and the computing devices 20 may include additional or fewer components in certain embodiments.

In addition, in certain embodiments, the computing devices 20 may also include communication circuitry 38 configured to facilitate communication between the respective computing device 20 and the account management system 12 described herein. For example, in certain embodiments, the computing devices 20 may transmit data relating to detected activity with respect to the smart contract 13 and/or assets to the account management system 12 to facilitate execution of the smart contract 13. In certain embodiments, the communication circuitry 38 may facilitate communications using Wi-Fi, near field communication, Bluetooth, Zigbee, radio frequency identification (RFID) tags and/or readers, an embedded wireless module, and/or another suitable wired or wireless communication network 40.

In addition, in certain embodiments, as described in greater detail herein, external data sources 42 may be used to collect data relating to users 16 or transactions or activities relevant to the smart contract 13 that may be used by the account management system 12 in analyzing an applying entity and executing the smart contract 13. In certain embodiments, the external data sources 42 may include, but are not limited to, merchants, financial institutions, social media platforms, streaming services, and so forth, which may be interacted with by the users 16, for example, either via applications being executed on computing devices 20 associated with the user 16 or in person. As will be appreciated, commercial activity with these external data sources 42 may also be communicated to the account management system 12 via the communication network 40.

In certain embodiments, the account management system 12 may include communication circuitry 46 configured to facilitate communication between the account management system 12 and the computing devices 20, the blockchain network 14, and/or the external data sources 42. For example, the account management system 12 may receive data relating to activity of users 16, the smart contract 13, or assets related to the bank account from one or more computing devices 20, the blockchain network 14, and/or one or more external data sources 42 via the communication network 40, and may automatically execute the smart contract 13 in accordance with its terms. In certain embodiments, the communication circuitry 46 may facilitate communications using Wi-Fi, near field communication, Bluetooth, Zigbee, radio frequency identification (RFID) tags and/or readers, an embedded wireless module, and/or another suitable wired or wireless communication network 40.

As illustrated in FIG. 1, in certain embodiments, the account management system 12 may include other processing circuitry such as one or more processors 48 (e.g., processing system) configured to execute instructions 50 stored in memory media 52 of the account management system 12, wherein the instructions 50, when executed by the one or more processors 48 (e.g., processing system), enable the account management system 12 to perform the functions described in greater detail herein. In certain embodiments, the one or more processors 48 (e.g., processing system) of the account management system 12 may be any suitable type of computer processors or microprocessors capable of executing computer-executable code. In certain embodiments, the memory media 52 of the account management system 12 may be any suitable articles of manufacture that can serve as media to store processor-executable code, data, or the like. These articles of manufacture may represent computer-readable media (e.g., any suitable form of memory or storage) that may store processor-executable code (e.g., the instructions 50) executed by the one or more processors 48 (e.g., processing system) to perform the presently disclosed techniques.

In certain embodiments, the memory media 52 of the account management system 12 may also be used to store data relating to detected activity of users 16, as described in greater detail herein. In certain embodiments, the memory media 52 of the account management system 12 may represent tangible, non-transitory computer-readable media (e.g., any suitable form of memory or storage) that may store the processor-executable code used by the one or more processors 48 (e.g., processing system) to perform various techniques described herein. It should be noted that non-transitory merely indicates that the media is tangible and not a signal. It should be noted that the components described above with regard to the account management system 12 are exemplary components, and the account management system 12 may include additional or fewer components in certain embodiments.

In addition, in certain embodiments, the account management system 12 may function as an execution layer (e.g., as plug-in software) that any and all software applications interacting with the blockchain network 14 and other external data sources 22 may utilize to enable the account management system 12 to monitor activity related to the smart contract 13 and to execute the smart contract 13, as described in greater detail herein. Indeed, in certain embodiments, the account management system 12 may be deployed as a cloud-based account management network to facilitate decentralized management of the smart contracts described herein.

Figure 2:
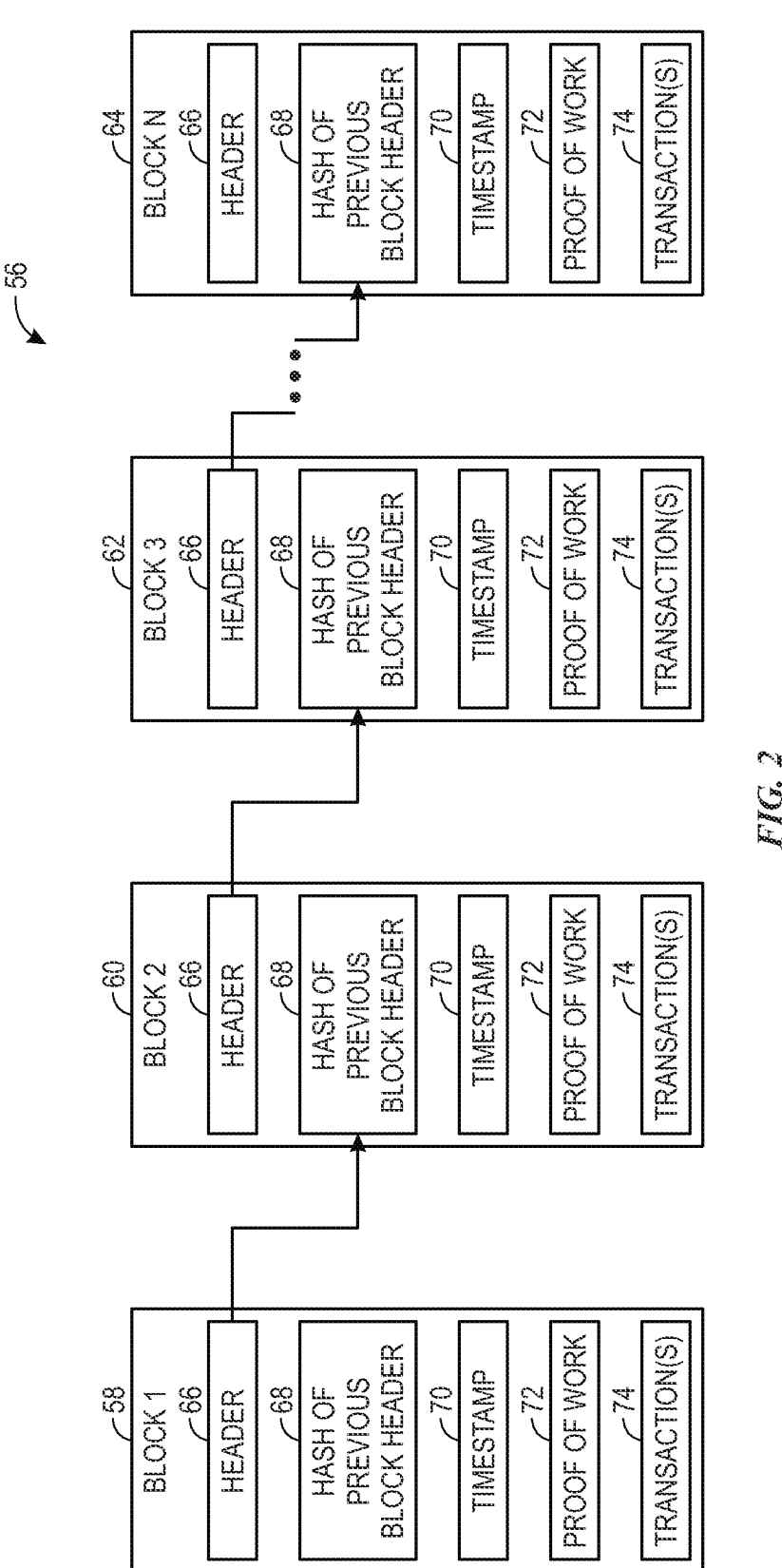
FIG. 2 illustrates a block diagram of a blockchain of a blockchain network of FIG. 1, in accordance with aspects of the present disclosure.

FIG. 2 illustrates a block diagram of a blockchain 56 of the blockchain network 14 of FIG. 1 which includes the smart contracts related to the management of the bank account. In the illustrated embodiment, the blockchain 56 is illustrated as having multiple blocks 58, 60, 62, and 64. The block 58 (first block in the blockchain 56) may have been created and allocated as a special starting block. The block 58 may include a unique header 66 uniquely identifying the block 58 from other blocks in the blockchain 56. Because the block 58 is the first block in the blockchain 56, a hash of a previous block header 66 may be set to zero. A timestamp 70 may include the date of creation for the block 58, and a proof of work section 72 may include certain "work" that proves that a "miner" has performed work suitable for the creation of the block 58 and/or to verify transactions in the blockchain 56. The work section 72 may vary based on a protocol used to create the blockchain 56. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 56, and so on, down the tree. In other words, there is no way to create a fake value that would hash to an expected Merkle tree value (e.g., value stored in work section 72 of the block 58), thus creating a single value that proves the integrity of all of the transactions under it. Transactions, such as transactions related to the smart contract/assets described herein, may be stored in a transactions section 74. Data related to the particular transaction may also be stored in transactions section 74 (or in another section).

When a new block is created, the block will receive a new header 66 uniquely identifying the new block. As described in greater detail herein, a peer-to-peer network may include multiple "miners" that add blocks to the blockchain 56 based on the blockchain protocol. In general, multiple miners validate transactions 74 that are to be added to a block, and compete (e.g., perform computing work, as introduced above) to have their respective block added to the blockchain 56. Validation of transactions includes verifying digital signatures associated with respective transactions 74. For a block to be added to the blockchain 56, a miner must demonstrate a proof of work before their proposed block of transactions is accepted by the peer-to-peer network, and before the block is added to the blockchain 56. In certain embodiments, a blockchain protocol include a proof of work scheme (e.g., Merkle Trec) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 68) in the blockchain 56, details of the transaction(s) 74 that are to be included in the to-be-created block, and a "nonce" value (e.g., a random number used only once).

Multiple nodes may compete to hash a set of transactions, and to provide the next block that is to be added to the blockchain 56. In certain embodiments, the blockchain protocol may provide a threshold hash to qualify a block to be added to the blockchain 56. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 56. Each miner provides the reference to the previous (most recent) block in the blockchain 56, details of the transaction(s) 74 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 56. Consequently, the respective miner's block is broadcast across the peer-to-peer network. At this point, all other miners cease work (because one miner was already successful), and all copies of the blockchain 56 are updated across the peer-to-peer network to append the block to the blockchain 56. Each miner may produce hundreds of thousands (or more) of hash values, before any one miner provides a qualifying hash value (e.g., at least the first four characters of the hash value are each zero).

It is to be noted that any computing device 20 may be miners. Accordingly, for example, as new data is created, new blocks may be added to the blockchain 56, including blocks 58, 60, 62, and 64. Indeed, the blockchain 56 may continue to grow, storing new data as it becomes available. Because of the distributed nature of the peer-to-peer network created via the blockchain network 54, each node may include copies of the blockchain 56 and share copies of the blockchain 56 as new peers enter the peer-to-peer network. Each copy of the blockchain 56 may include verified information for all or substantially all of the data tracked by the blockchain network 54. The information is secure, immutable, and more efficiently tracked as new added gets added via the blockchain network 54.

Figure 3:
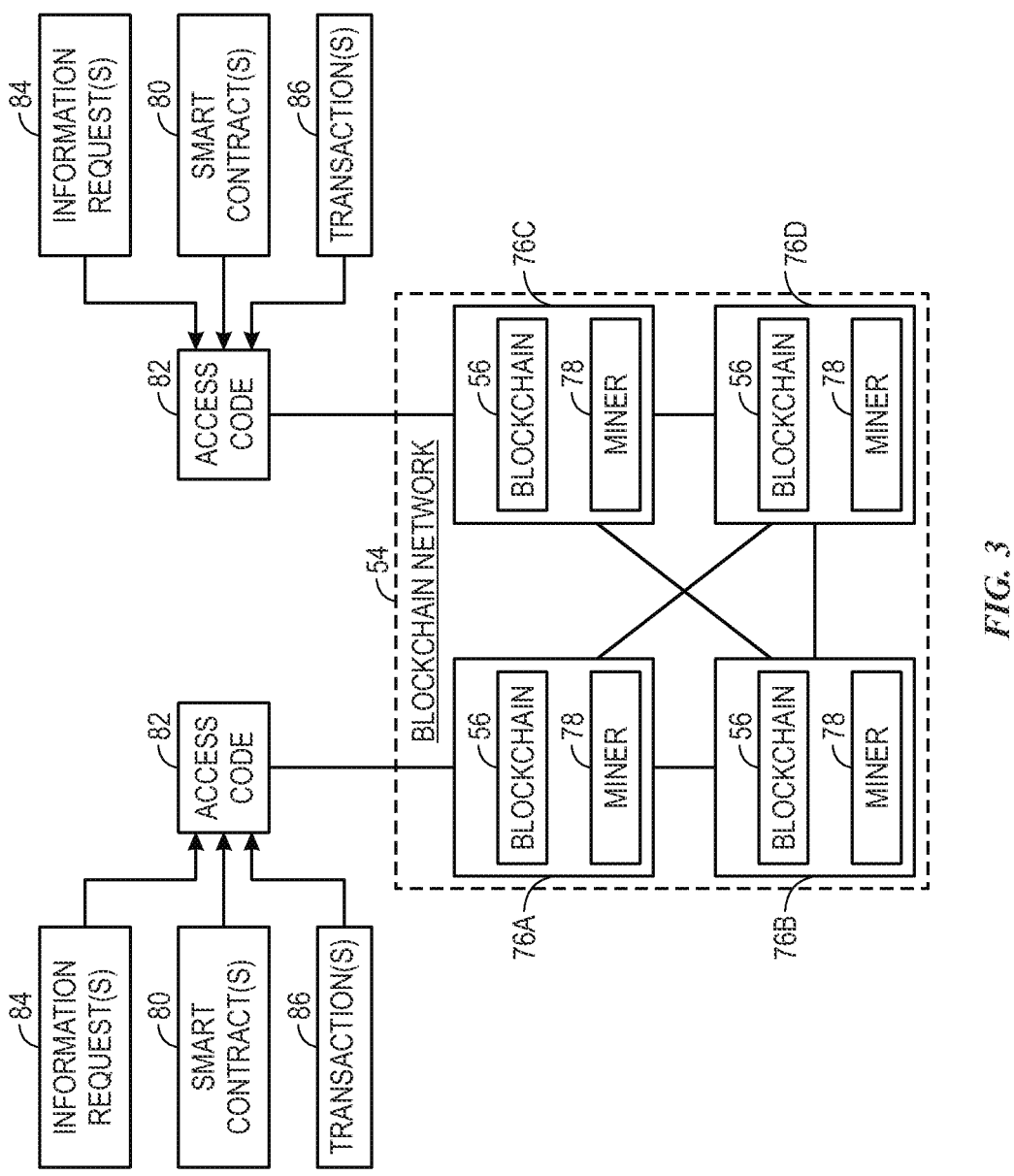
FIG. 3 illustrates a block diagram of a portion of the system of FIG. 1, which may be used to manage a bank account utilizing smart contracts distributed across a distributed ledger (e.g., blockchain network), in accordance with aspects of the present disclosure.

FIG. 3 illustrates a portion of the system 10 of FIG. 1, which may be used to manage a bank account using smart contracts distributed across a distributed ledger (e.g., blockchain network) 54, in accordance with embodiments described herein. As described herein, the blockchain network 54 may be formed by several blockchain nodes, such as blockchain nodes 76A, 76B, 76C, and 76D, which may be implemented by a dedicated server or computer device, or may be implemented as a virtual machine in a shared computer system. Each blockchain node 76A-D may have in its memory a replicate of the blockchain 56. Each blockchain node 76A-D may also have a miner 78, an application that may verify the integrity of the blockchain 56, and may also perform operations and/or transactions using smart contracts 80 associated with the blockchain 56. As described herein, the blockchain 56 is a replicated data structure that may have its consistency and integrity preserved by a consensus mechanism performed by the miners 78.

Users may interact with the blockchain network 54 via an access node 82. For example, users may request, through the access node 82, the recordation and/or processing of data (e.g., using a smart contract 80), such as an information request 84 (e.g., a request for the state of a smart contract 80), or a transaction request 86 (e.g., a request for a change in a state of the smart contract 80) to the blockchain 56. The smart contracts 80, information requests 84, and/or transaction requests 86 allow users to record certain data relating to related to the management of a bank account via smart contracts/assets described herein. Each access node 82 may be implemented by a computer terminal coupled to the blockchain network 54.

A miner 78 from any of the blockchain nodes 76A, 76B, 76C, and 76D may create an update to the blockchain 56. In certain embodiments, the smart contract(s) 80 may be a data structure that may include states (e.g., internal states) and transaction instructions relating to the data stored in the blockchain 56. The transactions, or functions, may include instructions that modify the states of the smart contracts 80 and/or interact with other smart contracts 80 by performing further transactions. Examples of smart contracts 80 described herein include smart contracts 80 related to storing data relating to management of agreements associated with a bank account described herein. Following insertion of a smart contract 80, the blockchain node 76 may propagate its update of the blockchain 56, and the other blockchain nodes 76 may accept the update using a consensus mechanism (e.g., proof of work, proof of stake, and so forth). For example, if blockchain node 76A generated a blockchain segment that incorporates some smart contract 80 to the blockchain 56, blockchain node 76A may propagate the updated blockchain 56 to blockchain nodes 76B, 76C, and 76D, which may validate and accept the updated blockchain 56.

Similarly, a transaction request 86 may be received by any miner 78 of the blockchain nodes 76A, 76B, 76C, and 76D via an access node 82. The transaction request 86 may perform operations that cause a change in the state of a smart contract 80 recorded in the blockchain 56. After performing the desired operations, and changing the state of the smart contract 80, in accordance with the transaction request 86, the miner 78 may update the blockchain 56 to record the updated state of the smart contract 80. The updated state of the smart contract 80 may be propagated to the blockchain nodes 76A-D, verified, and persisted using consensus mechanisms. An information request 84, similar to a transaction request 86, may be received by a miner 78, and may perform operations associated with a smart contract 80. However, in contrast with the transaction request 86, the information request 84 does not lead to changes in the state of the smart contract 80 and, thus, updates to the blockchain 56 that result from a successful information request 84 are not performed.

In certain embodiments, performance of the operations by the miners 78 of the blockchain nodes 76 may be incentivized and/or regulated by exchange of tokens (e.g., currencies) of the blockchain 56. For example, in public blockchains, updates to the blockchain 56 by a blockchain node 76A-D may be rewarded with a blockchain token. Moreover, performance of a transaction request 86 or an information request 84 may be rewarded with a blockchain token. For example, in certain embodiments, in the Ethereum public blockchain, updates to the blockchain from recordation of smart contracts 80 and information requests 84 may be rewarded with Ether tokens, and performance of transaction requests 86 and information requests 84 may be incentivized by offers of Ethers in the form of a secondary token called "gas". In certain private blockchain embodiments, tokens may be used to implement prioritization mechanisms for the operations and/or to prevent large or faulty operations from blocking the blockchain 56 with arbitrarily long operation times.

Figure 4:
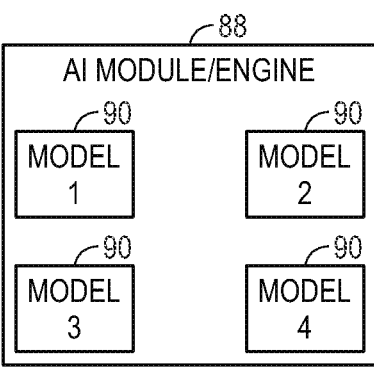
FIG. 4 illustrates a block diagram of an artificial intelligence module for managing a bank account utilizing smart contracts, in accordance with aspects of the present disclosure.

FIG. 4 illustrates an artificial intelligence (AI) module or engine 88 for managing a bank account utilizing smart contracts. The AI module 88 may be part of the account management system 12 described in FIG. 1. As previously mentioned, the AI module 88 may be utilized to automatically handle the bulk of the interactions related to a bank account utilizing smart contracts. The AI module 88 handles answering questions from applicants (e.g., entities such as a company or event) wanting to enter an agreement with the account owning entity to receive funds/assets from the bank account. The AI module 88 also analyzes the background of the applying entities to make sure the applying entities meet certain requirements (e.g., applicant be a woman, a particular minority group, or not conduct undesired behavior (e.g., harm animals)) as determined by the account owning entity.

The AI module 88 distributes funds and/or assets to the approved entity in accordance with the smart contract. The assets may be provided with requirements and metadata about how the assets are to be used. In certain embodiments, the assets may be provided as digital tokens on a distributed ledger or blockchain, where the digital tokens represent either digital or physical assets. In certain embodiments, the assets may be logo asset tokens that enable tracking and reporting of the assets when in use. These logo asset tokens may include metadata on how to use the logo asset tokens (e.g. logo must appear in physical prints, banners, posters, and on a website). The smart contract and/or assets self-report on where and how the assets are being utilized. The AI module 88 gathers the data and periodically (e.g., weekly or monthly) generate reports for review (e.g., by the account owning entity). In certain embodiments, alerts may be generated by the AI module 88 for violations of the smart contracts and notifications may be provided to the account owning entity (or asset owner) to take actions (e.g., make corrections to the smart contract, terminate contract, etc.).

The AI module 88 utilizes inputs from the account owning entity to generate one or more smart contracts for managing the bank account. In certain embodiments, the AI module 88 may have a plurality of different models 90 of smart contracts (e.g., associated with different types of arrangements or agreements) to select from and modify based on the received inputs. In addition, different models 90 of smart contracts may be associated with different regional laws.

The AI module 88 is trained on a variety of different types of contracts for different types of arrangements and contingencies. The training may occur via supervised learning where the inputted training data is marked up or annotated for training. The training data may be scan of physical document and contracts. The training data may be imported digital files. Information may be manually input to further train the AI module 88. For example, when to use specific language or reject certain provisions. In addition, the AI module 88 is trained to take into the account the contract law in the applicable region of the entities. In certain embodiments, the AI module 88 may be trained to pull information form another source (e.g., form, spreadsheet, or chatbot) in creating a contract. In certain embodiments, natural language processing may be utilized in the training of the AI module 88. The AI module 88 may be also trained to convert layman terms into legal terms and vice versa. The training data may be marked up to associate a variety of layman terms with legal terms.

Figure 5:
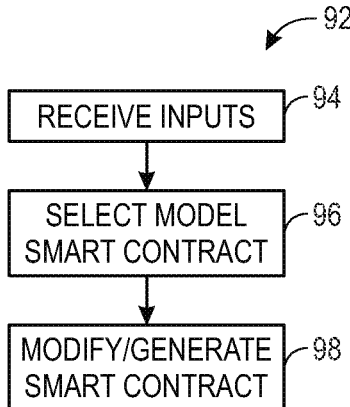
FIG. 5 is a flowchart of a method for generating a smart contract for managing a bank account, in accordance with aspects of the present disclosure.

FIG. 5 is a flowchart of a method 92 for generating a smart contract for managing a bank account. One or more steps of the method 92 may be carried out by one or more components of the account management system 12 illustrated in FIG. 1. One or more steps of the method 92 may be performed simultaneously or in a different order from the order depicted in FIG. 5. The method 92 includes receiving inputs from an entity (e.g., organization, corporation, individual such as a small startup or individual artist) who owns a bank account (block 94). These inputs may relate to the type of agreements they want to enter (e.g., sponsorship agreement, affiliate marketing agreement, etc.). The inputs may also relate to how the assets and/or funds in the bank account are to be utilized. For example, the inputs may relate to when funds are to be distributed and/or how much of the funds are to be distributed upon a sponsee or affiliate performing a particular task or reaching a certain goal (e.g., number of referrals or sale of account owning entity's products). The inputs may be further related to requirements that the applying entity must meet to be able to enter an agreement with the account owning entity to utilize the funds and/or assets within the bank account. The requirements may be that the applying entity meet a certain criteria. For example, the entity may have to be a woman, to be a particular minority group, or that the entity engages in certain activities (e.g., providing support to an underserved group). In certain embodiments, the requirements may be that the applying entity not engage in or promote certain activities (e.g., harming of animals, use of guns, etc.). In certain embodiments, the inputs may be provided verbally. In certain embodiments, the inputs may be provided in layman terms and the account management system may convert and present these inputs in legal terms within a smart contract.

In certain embodiments, the method 92 includes selecting, via an AI module, a model smart contract from a plurality of smart contract models based on the inputs provided by the account owning entity (block 96). The model smart contract forms the basis for generating a smart contract that is representative of the agreement desired by the account owning entity. The AI module may have a plurality of different models of smart contracts (e.g., associated with different types of arrangements or agreements) to select from. In addition, different models of smart contracts may be associated with different regional laws.

The method 92 also includes modifying or generating a smart contract that is representative of the agreement desired by the account owning entity (block 98). When the account management system selects a model contract, the model contract is modified to generate the desired smart contract based on the inputs provided by the account owning entity. In certain embodiments, the account management system may utilize a single generic model smart contract as an initial smart contract that is modified based on the inputs provided by the account owning entity. In certain embodiments, the account management system may not utilize an initial model smart contract in generating the smart contract. The generated smart contract, when entered into with another entity, executes the agreement automatically (e.g., tracks assets, generate reports, distributes funds and/or assets, etc.). The smart contract holds all of the business logic or requirements for the agreement.

Figure 6:
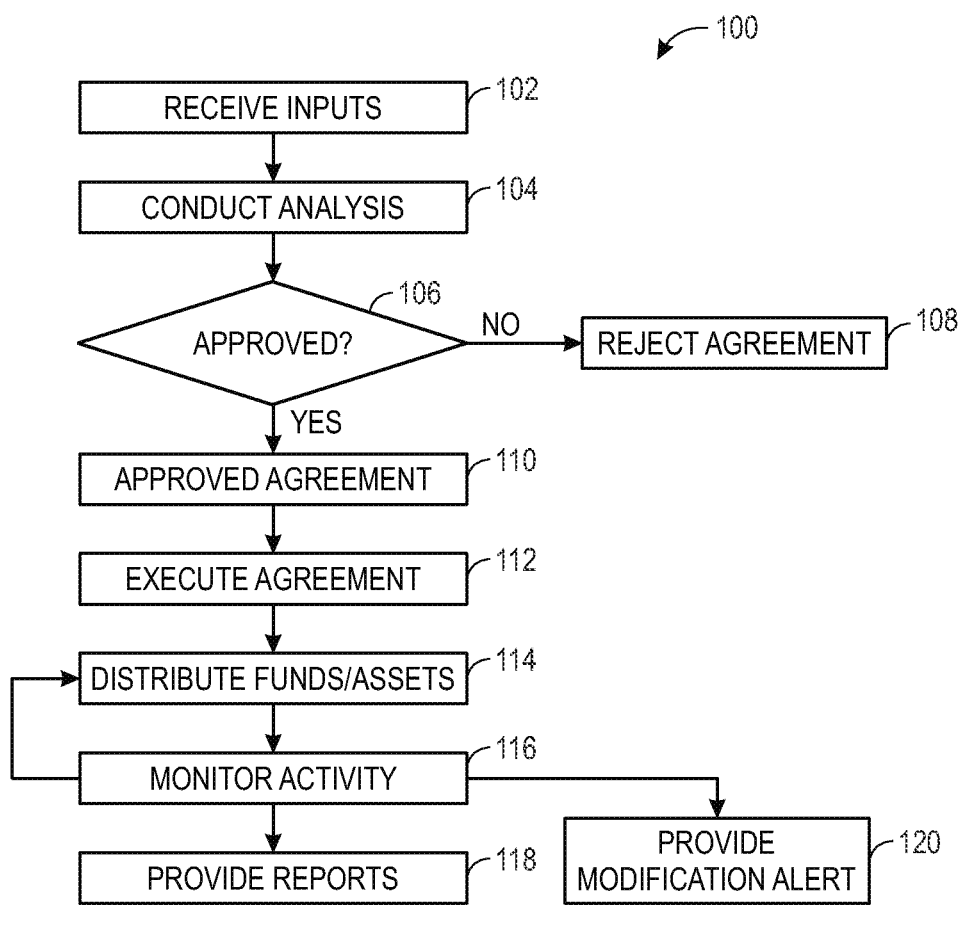
FIG. 6 is a flowchart of a method for entering and monitoring a smart contract for an agreement associated with a bank account, in accordance with aspects of the present disclosure.

FIG. 6 is a flowchart of a method 100 for entering and monitoring a smart contract for an agreement associated with a bank account. One or more steps of the method 100 may be carried out by one or more components of the account management system 12 illustrated in FIG. 1. One or more steps of the method 100 may be performed simultaneously or in a different order from the order depicted in FIG. 6. The method 100 includes receiving an application and application-related inputs from a first entity (e.g., applying entity) for entering into an agreement (e.g., sponsorship agreement, affiliate marketing agreement, insurance agreement, etc.) to receive assets and/or funds from a bank account owned by a second entity (e.g., account owning entity) (block 102). The inputs may include identification information (e.g., of the applying entity), type of agreement sought, purpose for the agreement, background information, desired duration of agreement, any information related to the requirements laid out for agreement by account owning entity, and other information.

The method 100 also includes conducting, via an artificial intelligence module, an analysis (including a background check) of the applying entity based on the inputs provided by the applying entity (block 104). The analysis includes determining if the applying entity meets all the requirement to enter the agreement (i.e., smart contract) with the account owning entity.

The method 100 further includes determining, via the intelligence module, if the applying entity is approved for entering into the agreement (i.e., smart contract) with the account owning entity (block 106). When the applying entity is not approved, the method 100 includes rejecting an agreement between the applying entity and the account owning entity (block 108). The applying entity may not be approved due to failing the analysis (e.g., not meeting one or more requirements or not passing a background check). An indication of the disapproval may be provided on a computing device utilized by the applying entity. The method 100 includes, upon the applying entity passing the analysis and meeting the requirements, approving the agreement between the applying entity and the account owning entity (block 110). An indication of the approval may be provided on a computing device utilized by the applying entity.

Upon approval of the agreement, the method 100 includes automatically executing, via the artificial intelligence module, the agreement (via the smart contract representative of the agreement) (block 112). The smart contract may include various APIs agreed to by the sponsored or affiliated entity that enables the smart contracts to connect to various applications or platforms utilized by the sponsored or affiliate entity.

As part of executing the agreement, the method 100 includes automatically, via the artificial intelligence module, distributing funds and/or assets to the first entity (e.g., sponsee or affiliate) (block 114). The assets may be provided with requirements and metadata about how the assets are to be used. In certain embodiments, the assets may be provided as digital tokens on a distributed ledger or blockchain, where the digital tokens represent either digital or physical assets. In certain embodiments, the assets may be logo asset tokens that enable tracking and reporting of the assets when in use. These logo asset tokens may include metadata on how to use the logo asset tokens (e.g. logo must appear in physical prints, banners, posters, and on a website).

Also, as part of executing the agreement, the method 100 includes monitoring activity, via the artificial intelligence module, monitoring activity of first entity (e.g., sponsee or affiliate) with respect to the agreement (i.e., smart contract) (block 116). Monitoring activity includes tracking the utilization of the assets and/or funds and other activity dictated by the smart contract. In certain embodiments, the smart contract/assets are self-reporting. The activity of the first entity may be monitored by the artificial intelligence module over multiple platforms and applications where the first entity may utilize the assets and/or funds. In response to certain activity, (e.g., sales or referrals by the first entity with regard to a product or service by the second entity), the method 100 further distributes the funds and/or assets (block 114).

Further, as part of executing the agreement, the method 100 includes providing reports (e.g., periodically) (block 118). The smart contract and/or assets self-report on where and how the assets are being utilized. The account management system, via the artificial intelligence module, gathers the data and periodically (e.g., weekly or monthly) generate reports for review (e.g., by the account owning entity). In certain embodiments, the method 100 includes providing user-perceptible notifications or alerts for violations of the smart contract (block 120) and notifications may be provided to the account owning entity (or asset owner) to take actions (e.g., make corrections to the smart contract, terminate contract, etc.) in response to these violations.

Figure 7:
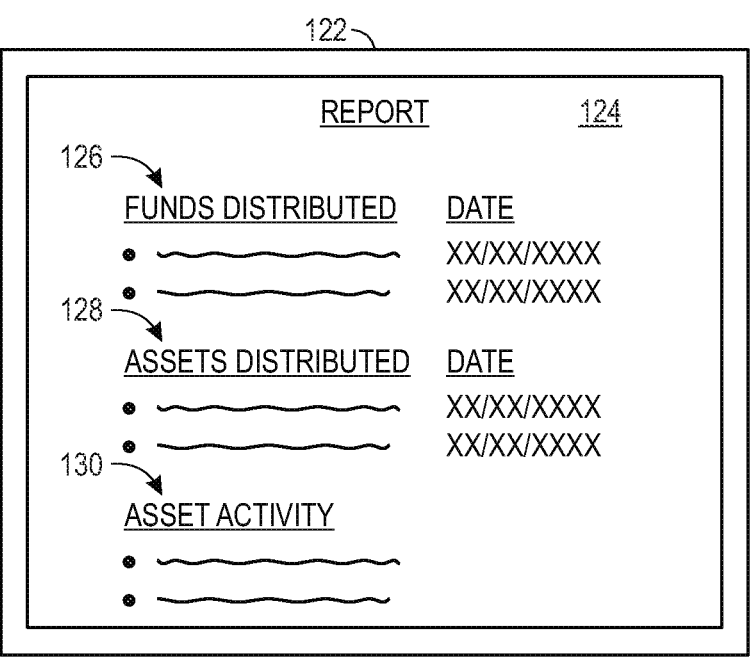
FIG. 7 is a schematic diagram of a user interface presented to a user having a report related to activity for an agreement associated with a bank account, in accordance with aspects of the present disclosure.

FIG. 7 is a schematic diagram of a user interface 122 presented to a user having a report 124 related to activity for an agreement (i.e., smart contract) associated with a bank account. The report 124 includes a summary 126 the amounts and dates of funds distributed from the bank account. The report 124 also includes a summary 128 of the assets distributed and the dates the assets were distributed. The report 124 further includes a summary 130 of asset activity. In certain embodiments, the summary 130 of the asset activity may include an indication as to whether a particular activity was within or outside a scope of the agreement.

Figure 8:
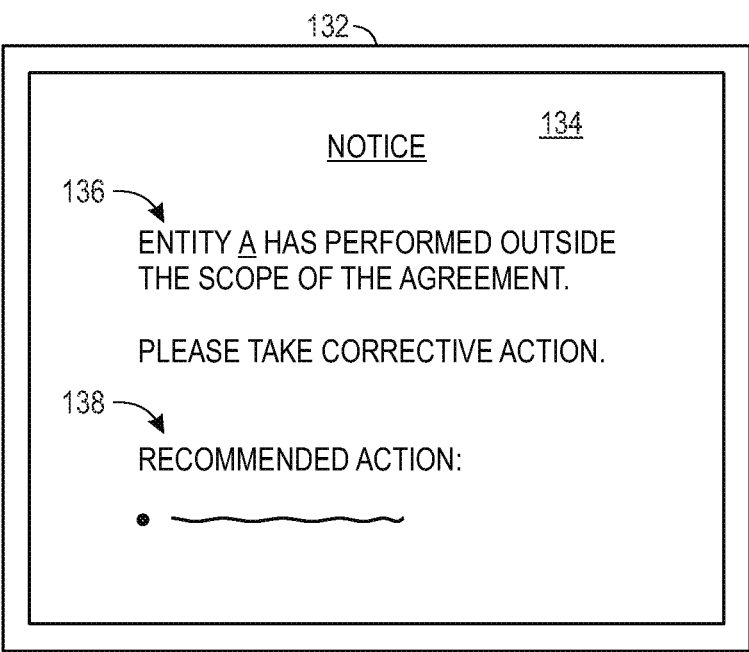
FIG. 8 is a schematic diagram of a user interface presented to a user of a notification of activity outside a scope of an agreement, in accordance with aspects of the present disclosure.

FIG. 8 is a schematic diagram of a user interface 132 presented to a user of a notification 134 of activity outside a scope of an agreement. As mentioned above, an alert or notification may be provided to account owning entity when the sponsored or affiliated entity performs an action (e.g., utilizes funds or assets incorrectly (e.g., without a logo of the sponsor) or fails to utilize the asset at all) outside the scope of the agreement (e.g., smart contract). A summary 136 of the action may be provided. In addition, a recommended corrective action 138 may be recommended (e.g., make corrections to the smart contract, terminate contract, etc.).

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for managing a bank account utilizing smart contracts, comprising:
   a processing system comprising one or more hardware processors; and
   a non-transitory memory, the non-transitory memory storing instructions that, when executed by the processing system, causes the processing system to perform actions comprising:
   receiving an application and application-related inputs from a first entity for entering into an agreement to receive assets and funds from the bank account owned by a second entity;
   conducting, via an artificial intelligence module, an analysis of the first entity based on the application-related inputs;
   approving and executing, via the artificial intelligence module, a smart contract that is representative of the agreement between the first entity and the second entity when the analysis of the first entity meets specific requirements, wherein the smart contract is distributed across a blockchain network, wherein executing the smart contract comprises distributing the assets and the funds to the first entity in accordance with the smart contract, wherein executing the smart contract comprises monitoring utilization of the assets by the first entity, wherein the assets are provided as digital tokens on the blockchain network, wherein the assets comprise logo asset tokens that enable their utilization to be tracked by the artificial intelligence module, and wherein the smart contract is configured to self-report on how the assets are utilized; and
   providing, via the artificial intelligence module, a user-perceptible notification to the second entity when activity by the first entity falls outside a scope of the smart contract.

2. The system of claim 1, wherein the agreement comprises a sponsorship agreement or an affiliate marketing agreement.

3. The system of claim 1, wherein the digital tokens represent digital assets and/or physical assets.

4. The system of claim 1, wherein executing the smart contract comprises providing metadata with the assets that provide instructions for utilizing the assets.

5. The system of claim 1, wherein the smart contract enables the artificial intelligence module to access applications or platforms utilized by the first entity via application programming interfaces for monitoring utilization of the assets by the first entity.

6. The system of claim 1, wherein the instructions, when executed by the processing system, causes the processing system to generate, via the artificial intelligence module, a report to provide to the second entity based on the monitored utilization of the assets by the first entity, wherein the report comprises a summary of transactions under the smart contract.

7. The system of claim 1, wherein the instructions, when executed by the processing system, causes the processing system to receive inputs from the second entity related to the agreement and to generate, via the artificial intelligence module, the smart contract based on the inputs.

8. The system of claim 7, wherein the inputs comprise the specific requirements.

9. The system of claim 7, wherein the inputs are provided in layman terms by the second entity and converted into legal terms by the artificial intelligence module trained to convert various layman terms into specific legal terms.

10. The system of claim 7, wherein generating the smart contract comprises utilizing the artificial intelligence module to select a model smart contract from a plurality of different smart contracts and to modify the model smart contract selected by the artificial intelligence module based on the inputs to generate the smart contract.

11. A computer-implemented method for managing a bank account utilizing smart contracts, comprising:
   receiving, at a processing system, an application and application-related inputs from a first entity for entering into an agreement to receive assets and funds from the bank account owned by a second entity;
   conducting, via an artificial intelligence module via the processing system, an analysis of the first entity based on the application-related inputs;
   approving and executing, via the artificial intelligence module via the processing system, a smart contract that is representative of the agreement between the first entity and the second entity when the analysis of the first entity meets specific requirements, wherein the smart contract is distributed across a blockchain network, wherein executing the smart contract comprises distributing the assets and the funds to the first entity in accordance with the smart contract, wherein executing the smart contract comprises monitoring utilization of the assets by the first entity, wherein the assets are provided as digital tokens on the blockchain network, wherein the assets comprise logo asset tokens that enable their utilization to be tracked by the artificial intelligence module, and wherein the smart contract is configured to self-report on how the assets are utilized; and
   providing, via the artificial intelligence module via the processing system, a user-perceptible notification to the second entity when activity by the first entity falls outside a scope of the smart contract.

12. The computer-implemented method of claim 11, wherein the smart contract enables the artificial intelligence module to access applications or platforms utilized by the first entity via application programming interfaces for monitoring utilization of the assets by the first entity.

13. The computer-implemented method of claim 11, further comprising generating, via the artificial intelligence module via the processing system, a report to provide to the second entity based on the monitored utilization of the assets by the first entity, wherein the report comprises a summary of transactions under the smart contract.

14. A non-transitory computer-readable medium, the non-transitory computer-readable medium comprising processor-executable code that when executed by a processing system, causes the processing system to:

receive an application and application-related inputs from a first entity for entering into an agreement to receive assets and funds from a bank account owned by a second entity;

conduct, via an artificial intelligence module, an analysis of the first entity based on the application-related inputs;

receive inputs from the second entity related to the agreement and to generate, via the artificial intelligence module, a smart contract based on the inputs;

approve and execute, via the artificial intelligence module, the smart contract that is representative of the agreement between the first entity and the second entity when the analysis of the first entity meets specific requirements, wherein the smart contract is distributed across a blockchain network, wherein executing the smart contract comprises distributing the assets and the funds to the first entity in accordance with the smart contract, wherein executing the smart contract comprises monitoring utilization of the assets by the first entity, wherein the assets are provided as digital tokens on the blockchain network, wherein the assets comprise logo asset tokens that enable their utilization to be tracked by the artificial intelligence module, and wherein the smart contract is configured to self-report on how the assets are utilized; and provide, via the artificial intelligence module, a user-perceptible notification to the second entity when activity by the first entity falls outside a scope of the smart contract.

15. The non-transitory computer-readable medium of claim 14, wherein the inputs are provided in layman terms by the second entity and converted into legal terms by the artificial intelligence module trained to convert various layman terms into specific legal terms.

16. The non-transitory computer-readable medium of claim 14, wherein generating the smart contract comprises utilizing the artificial intelligence module to select a model smart contract from a plurality of different smart contracts and to modify the model smart contract selected by the artificial intelligence module based on the inputs to generate the smart contract.

* * * * *